United States Patent Office 3,540,127
Patented Nov. 17, 1970

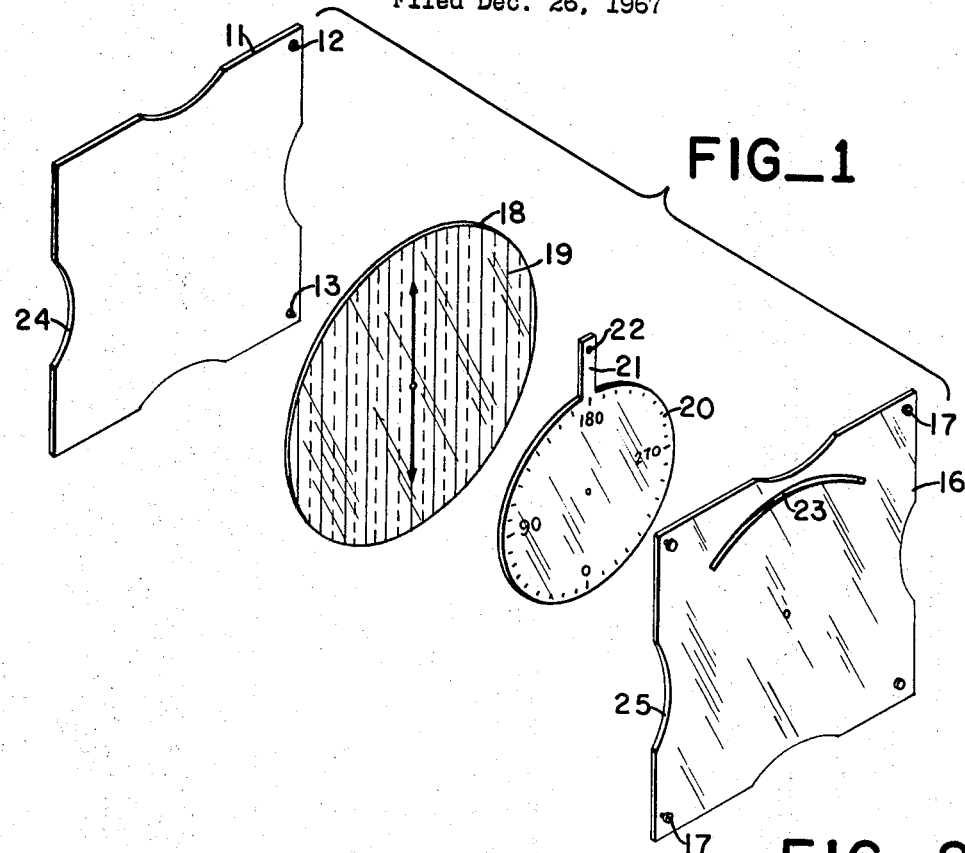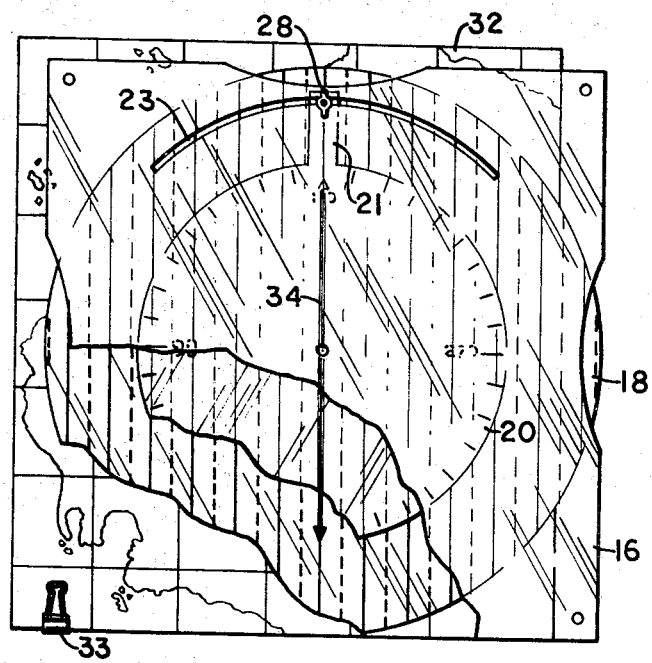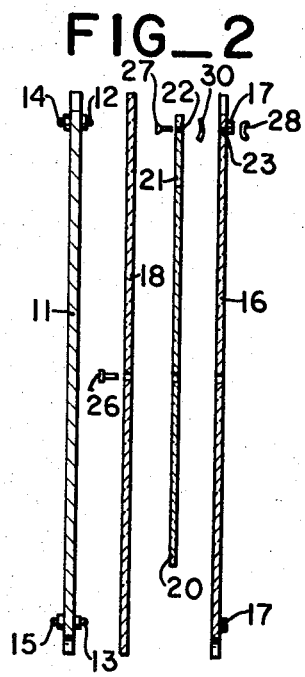

3,540,127
NAVIGATIONAL PLOTTING DEVICE
George R. Kane, Burlingame, Calif.
(122 N. El Camino Real, San Mateo, Calif. 94401)
Filed Dec. 26, 1967, Ser. No. 693,364
Int. Cl. G01c 21/20
U.S. Cl. 33—1                                    7 Claims

ABSTRACT OF THE DISCLOSURE

A navigational plotting device is disclosed wherein there is provided a flat backboard on which may be positioned a chart used for navigation and to either surface of which may be fixed a plotting surface, and wherein there is provided between the backboard and plotting service a grid pivotally mounted to the plotting surface, and a separate compass rose also pivotally mounted to the plotting surface and including means to hold the compass rose in a stationary position relative to the plotting surface.

---

This invention relates to new and improved navigational plotting devices and in particular to small hand-held navigational devices suitable for small boat and aircraft navigation.

Navigational plotting devices designed for use in the limited space available in small boats or aircraft which the operator may use while at the controls, heretofore made, have suffered from lack of versatility and required unnecessary calculations by the operator.

The object of the present invention is to provide the operator of a small boat or aircraft with a new and improved versatile navigational plotting device which can be used with any navigation chart and which reduces to a minimum the calculations required to obtain plotting information.

Another object of the invention is to provide a navigational plotting device which can be used with any chart no matter what the scale or the angular orientation of the chart in the device, and without the necessity of cutting or mutilating the chart in any way.

In order to accomplish these results, the present invention contemplates the provision of a flat backboard on which the chart to be used can be positioned or around which the chart can be folded, and a transparent plotting surface which can be attached to either side of the backboard over the chart. The invention further contemplates providing a navigation grid on a transparent disc pivotally mounted to the plotting surface and a separate compass rose, also pivotally mounted to the plotting surface and including means for holding the compass rose in a fixed position relative to the plotting surface while the grid is free to rotate.

With this construction any chart can be positioned at any angular orientation on either surface of the blackboard, and the plotting surface placed thereon and the compass rose oriented with the compass rose of the chart so that the grid can then be rotated and aligned with points or directions on the chart for plotting courses.

Since the plotting surface can be attached to either surface of the backboard, a chart can be folded over an edge of the backboard and a course plotted on the chart first on one backboard surface and then the other without moving the chart.

Other objects, features and advantages of the present invention will become apparent in the following specification and accompanying drawings.

BRIEF DESCRIPTION OF THE DRAWINGS

FIG. 1 is a partial exploded view in perspective of a navigational plotting device embodying the present invention.

FIG. 2 is a cross-sectional exploded view of the navigational plotting device.

FIG. 3 is a plan view of the assembled navigational plotting device with a chart in place.

DESCRIPTION OF THE PREFERRED EMBODIMENT

In the embodiment of the present invention illustrated in FIG. 1 there is provided a flat backboard 11 of generally square shape having male snap fasteners positioned on both surfaces thereof at each of two adjacent corners, snap fasteners 12 and 13 facing outwardly from one surface and snap fasteners 14 and 15 facing outwardly from the opposite surface of backboard 11. A transparent plotting surface 16 also of generally square shape is provided with female snap fasteners 17 at each corner facing in the same direction. The plotting surface is thus adapted to be attached by two snap fasteners in any of four positions to either surface of backboard 11. Positioned intermediate the backboard 11 and plotting surface 16, and pivotally mounted at a central axis to the plotting surface is a navigational grid 18 comprising a disk of transparent material on which is formed a grid of parallel lines 19. Also pivotally mounted at the central axis to the plotting surface 16 is a separate compass rose 20 on which is marked the angular degrees of the compass. The compass rose includes an extension 21 and a hole 22 whereby the compass rose may be secured as hereinafter described in a fixed position relative to the plotting surface 16 by means of a small bolt 27 passing through the hole 22 and through an arcuate slit 23 cut in the plotting surface and centered at the central axis. Both the backboard and plotting surface are provided with indentations 24 and 25, respectively, whereby the grid 18 may be rotated when the device is assembled.

Referring to FIG. 2, the grid 18 and compass rose 20 are pivotally mounted, for rotation about a central axis, on plotting surface 16 by means of a pivot 26 inserted through holes centrally formed in the grid compass rose and plotting surface, respectively. The hole 22 in extension 21 of compass rose 20 is aligned so that upon rotation of the compass rose 20 relative to plotting surface 16, alignment is maintained between hole 22 and arcuate slit 23 in the plotting surface 16. Inserted through hole 22 is a threaded bolt 27 which also extends through arcuate slit 23 to a butterfly nut 28. Also mounted on the threaded bolt 27 intermediate the compass rose 20 and plotting surface 16 is a friction washer 30 whereby butterfly nut 28 can be tightened on bolt 27 to secure compass rose 20 in a desired angular position relative to plotting surface 16 and the chart being used in the device. With the arcuate length of slit 23 being between 90° and 180°, the plotting surface remains relatively rigid while still permitting the compass rose 20 to be positioned in any direction by selection of the appropriate two female snap fasteners 17 for attachment to the two male snap fasteners on the selected surface of the backboard and then rotation of the compass rose to the desired position.

The assembled device with a chart in position is illustrated in FIG. 3. According to the present invention the chart need not be cut or mutilated but can be folded and inserted between the plotting surface and backboard with the plotting surface attached to the backboard by two snap fasteners on one side. If desired, the chart can also be folded around the back of the backboard 11 so that other portions of the chart can be readily used by unsnapping the plotting surface and compass rose and gird pivotally mounted thereon and reattaching the plotting surface on the other side of backboard 11.

In addition with the plotting surface attached to backboard 11 and a chart 32 positioned between the plotting surface and backboard a second chart can be easily used without removing the first chart by sliding it between the plotting surface and first chart. Upon approaching a harbor or airport, a small scale chart may be slipped in with the larger area chart being used and the two charts used simultaneously adjacent each other. This permits instant surveillance of the detailed or larger area chart, so that course changes may be determined quickly by merely rotating the grid.

The navigational plotting device constructed according to the present invention performs many functions including course determination, position determination, current or wind drift correction by means of vector plotting, and true or magnetic course determination, all without the necessity of writing on or mutilating the chart. In using the invention, the chart is positioned on the backboard so that the section of the chart to be navigated appears in the region of the circular grid. Clips 33 or other suitable means can be used to mount the chart onto the backboard. When the chart is in position, the grid 18 is rotated until the parallel lines are parallel with either the meridians of the chart, if working from true north, or the magnetic north-south lines, if working from magnetic north. The compass rose is then rotated until the zero position is opposite the grid index pointer 34. The butterfly nut 38 is then tightened so that the compass rose is secured in a fixed position. The plotter and chart are then in alignment. If the navigator has the convenience of a chart table, the backboard need not be used and the plotting surface can be unsnapped from the backboard and anchored to the chart by means of tape or other suitable means. Alignment would then be undertaken as already described.

If an east-west traverse is desired, the plotting surface may be unsnapped from the baseboard, and the baseboard rotated 90° and the plotting surface resnapped thereon. This permits a chart to be advanced in an easterly or westerly direction without the necessity of removal or refolding of the chart.

Visual or radio bearings to determine position can be plotted by rotating the grid indicator consecutively to each of two desired bearings, drawing lines to the respective bearings and extending them until they intersect thereby providing position information.

The true or magnetic course, depending on chart alignment, can be determined by rotating the grid until parallel lines connect points of departure and destination. If a known current or wind exists drift correction must be made by the vectoring process. Wind or current drift compensation is calculated by first turning the grid until a parallel line connects points of departure and destination. The two points are connected with a course line on the plotting surface. The grid is then rotated until parallel lines follow the general direction of the current or wind. From the point of departure a line is drawn in the direction of the current or wind of length proportional to the magnitude of the current or wind according to a preselected ratio. A line is then drawn from the end of the vector representing the direction and magnitude of current or wind having a length proportional to the intended or true speed through the water or air according to the preselected ratio until it meets the course line joining the points of departure and destination or an extension thereof. This completes the vector triangle. The line joining the current or wind vector and the course line between the points of departure and destination is the course heading required to reach the point of destination under the prevailing conditions of current or wind. The distance along the course line joining the points of departure and destination between the point of departure and the point where the required course heading vector joins the course line represents the actual speed over the bottom or the ground. Utilizing the vector triangle method, any one of the vector legs of the triangle, i.e. the course line vector, magnetic or true heading vector, or the wind or current vector may be determined when the other two are known.

Using the present invention, if points of departure and destination fall between parallel lines on the grid, the parallel lines are sufficiently close together to provide a constructed parallel line between the points by interpolation.

The grid, compass rose, and plotting surface can be formed of a transparent rigid or semi-rigid material, preferably a plastic such as a vinyl plastic. With this material the chart can easily be viewed through the plotting surface, grid and compass and heavy lines can be drawn on the plotting surface such as with a felt pen and subsequently removed such as with a damp cloth. The baseboard can be constructed of a white styrene.

While one embodiment of the invention has been shown and described, it will be apparent that other adaptations and modifications can be made without departing from the spirit and scope of the invention.

What is claimed is:

1. A navigational plotting device comprising a flat transparent plotting surface; a compass rose in the form of a transparent disk having the degrees of a compass formed thereon at suitable intervals, said compass rose being pivotally mounted to the plotting surface for rotation about a central axis; a navigational grid comprising a transparent disk having straight parallel lines formed thereon, said grid being pivotally mounted to said plotting surface for rotation about said central axis, said plotting surface and pivotally mounted compass rose and grid being adapted for positioning over the portion of a chart to be navigated, a backboard on which a chart may be positioned, and means for mounting the plotting surface and pivotally mounted compass rose and grid on said backboard.

2. A navigational plotting device as set forth in claim 1 including means at two adjacent corners of at least one surface of said backboard for attaching said plotting surface to said backboard.

3. A navigational plotting device in accordance with claim 2 including attaching means at said two corners on both surfaces of said backboard.

4. A navigational plotting device as set forth in claim 1 wherein there is provided means for securing the compass rose in fixed rotational positions relative to the plotting surface.

5. A navigational plotting device as set forth in claim 4 wherein said means for securing the compass rose in fixed position relative to the plotting surface includes an arcuate slit in the plotting surface, and an extension on the compass rose having a hole therein, said hole and said arcuate slit being formed to remain in alignment during rotation of the compass rose relative to the plotting surface, and wherein there is provided bolt means through said hole and said slit means to frictionally engage the compass rose extension and plotting surface against each other.

6. A navigational plotting device comprising a flat transparent plotting surface; a compass rose in the form of a transparent disk having the degrees of a compass formed thereon at suitable intervals, said compass rose being pivotally mounted to the plotting surface for rotation about a central axis; means for securing the compass role in fixed rotational positions relative to the plotting surface; a navigational grid comprising a transparent disk having parallel lines formed thereon, said grid being pivotally mounted to said plotting surface for rotation about said central axis; a backboard on either side of which a chart may be mounted, and means for attaching the plotting surface and pivotally mounted compass rose and grid to said backboard over a chart mounted thereon.

7. A plotting device adapted to overlay a chart or map comprising:

a flat, transparent plotting surface formed of a material for eraseably receiving plotting indicia;

a compass rose in the form of a transparent disk having degrees of a compass formed therearound at suitable intervals, said compass rose being pivotally mounted beneath and attached to said plotting surface for rotation about a central axis;

means for securing the compass rose in fixed positions relative to the plotting surface thereby to provide the desired orientation for either magnetic or true chart readings; and a grid comprising a transparent disk pivotally mounted beneath and attached to said plotting surface for rotation about said central axis, said grid formed with a plurality of straight parallel lines operative with the elements of said plotter upon rotation of said grid for plotting courses, bearings, headings and positions on a chart with which the plotter is used.

References Cited

UNITED STATES PATENTS

| | | | |
|---|---|---|---|
| 2,007,986 | 7/1935 | Sprague | 33—1 |
| 2,114,652 | 4/1938 | Dalton | 33—1 |
| 2,408,571 | 10/1946 | Mitchell | 33—1 |
| 2,407,893 | 9/1946 | Meyer | 33—1 |
| 2,834,110 | 5/1958 | Malakoff | 33—1 |
| 3,373,493 | 3/1968 | McDonald | 33—1 |

WILLIAM D. MARTIN, Jr., Primary Examiner

U.S. Cl. X.R.

33—76; 235—61